H. C. EGERTON.
VULCANIZED RUBBER HOSE.
APPLICATION FILED OCT. 5, 1918. RENEWED JULY 27, 1920.
1,352,740.
Patented Sept. 14, 1920.
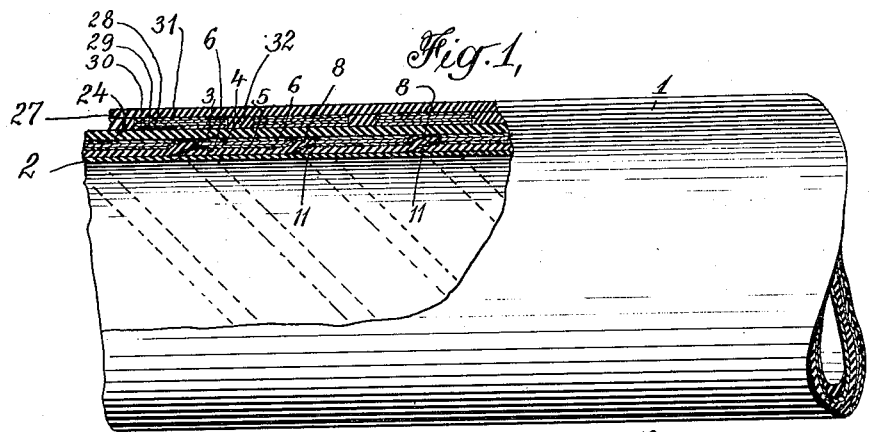
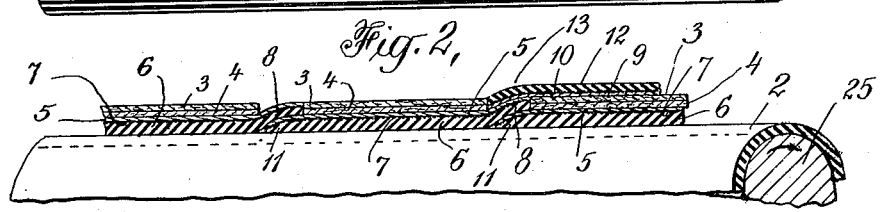
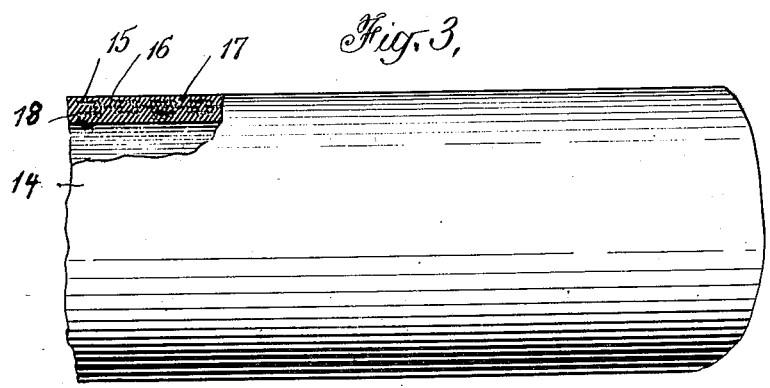
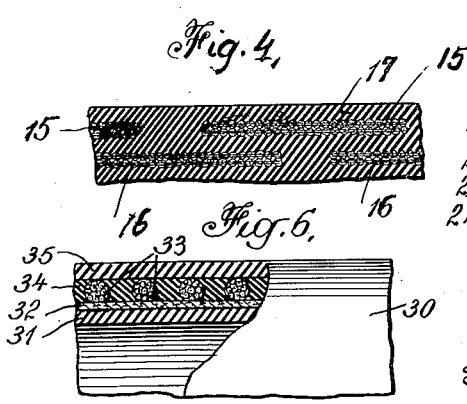
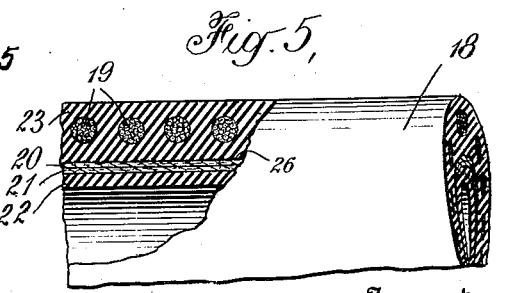
Inventor
Henry C. Egerton
By his Attorney
Harry L. Duncan

UNITED STATES PATENT OFFICE.

HENRY C. EGERTON, OF RIDGEWOOD, NEW JERSEY.

VULCANIZED RUBBER HOSE.

1,352,740.  Specification of Letters Patent.  Patented Sept. 14, 1920.

Application filed October 5, 1918, Serial No. 256,988. Renewed July 27, 1920. Serial No. 399,412.

*To all whom it may concern:*

Be it known that I, HENRY C. EGERTON, a citizen of the United States, and resident of Ridgewood, county of Bergen, State of New Jersey, have made a certain new and useful Invention relating to Vulcanized Rubber Hose, of which the following is a specification, taken in connection with the accompanying drawing.

This invention relates especially to flexible vulcanized rubber hose comprising a plurality of layers of vulcanized rubber which may include a lining and covering layer thereof and one or more interposed layers of fabric or other fibrous stiffening and reinforcing members carrying cured phenolic condensation cementing and stiffening material which are securely united to said rubber layers and preferably spirally arranged. The stiffening members may be formed of one or more layers of canvas or other woven or braided fabric or cords, ropes, or other fibrous material which are more or less impregnated or coated with phenolic condensation cementing material, such as bakelite, condensite or redmanol varnish compositions, the strips or members being then preferably dried at moderate heat of 150° to 175° F. more or less and while sufficiently heated to be flexible are wound or otherwise incorporated in the hose so as to be securely vulcanized or otherwise united to the rubber layers or portions. It is sometimes advisable to use connecting or uniting strips or members of canvas or other fabric or fibrous material which may be previously frictioned or otherwise rubber coated on one side with which the rubber layer or member of the hose engages, while the other side of such connector member is brought into engagement with the stiffening or reinforcing members and cemented thereto by the action of such phenolic condensation cementing material. These stiffening members may of course be in the form of more or less continuous sheets or layers inclosing the rubber lining or other hose layers or members, although for flexible hose these stiffening and reinforcing members are preferably in the form of encircling rings or strips which may be conveniently spirally arranged and staggered in position where several layers of such strips are used, the interposed layers of relatively elastic and flexible rubber promoting the bending of the hose.

In the accompanying drawing showing in a somewhat diagrammatic way illustrative embodiments of this invention, Figure 1 is a longitudinal elevation partly in section showing one form of such hose, the thickness of the wall portions being somewhat exaggerated for the sake of clearness.

Fig. 2 is an enlarged partial sectional view thereof showing the way in which such hose may be made.

Fig. 3 is a longitudinal partial section through another form of hose.

Fig. 4 is an enlarged detail section thereof; and

Figs. 5 and 6 show in partial section other hose constructions.

The hose 1 may as indicated in Fig. 1 comprise a series of vulcanized rubber layers which may include the lining 2 and covering layer 27, and also if desired one or more intermediate rubber layers such as 24. One or more interposed layers of stiffening or reinforcing members may be incorporated between these rubber layers and may be formed of fabric, cord or other fibrous material carrying or impregnated with such phenolic condensation cementing material which when cured at about the same heat used to vulcanize the rubber elements greatly strengthens and stiffens these fabric reinforcing members so that when heavy canvas is thoroughly impregnated with such phenolic condensation cementing material as bakelite varnish No. 1 for instance, which is present to the extent of about 50 per cent. of the weight of the cured fabric, a strip a sixteenth of an inch or so thick may have an ultimate bending strength of about 15,000 to 18,000 pounds per square inch. This material is of course considerably lighter than metal and it has the great advantage that reinforcing and stiffening strips or members thereof may be securely and strongly united to vulcanized rubber so that the destructive creeping and rubbing of metallic reinforcing elements in the hose fabric is minimized under conditions of use. By the use of several interposed strips of such fabric impregnated with cured phenolic condensation cementing material a reinforcing strip or tape of steel or other metal may, if desired, be interposed between such layers of fabric and completely surrounded thereby, the cementing material when cured strongly and permanently holding the fabric in position around the reinforcing metal strip so that it cannot creep or rub on any vulcanized rubber element of the hose. In this way a metal reinforcing strip can give to the hose added strength desired without the disadvantages of metal directly incorporated in the rubber hose walls. Any suitable form may be given to these fibrous reinforcing members or elements, such as ring, sheet or other form, although for ease of manufacture and strength combined with a moderate degree of flexibility spiral strips are desirable and several layers of such strips with interposed vulcanized rubber between them give good results. Such strips may of course be formed of either woven or braided fabric originally produced in strip form or the strips may be cut from canvas or other suitable fabric which makes it possible to impregnate or coat the original webs or lengths of fabric with such phenolic condensation cementing material and then after drying, if desired, the fabric may be cut into strips of the desired width and several layers simultaneously united if the cut strips are pressed together when moderately heated to render the cementing material adhesive.

One convenient way to produce such a hose fabric is indicated diagrammatically in Fig. 2 where the mandrel 25 is shown as having a layer 2 of vulcanized rubber applied thereto upon which may be wound the composite strips of rubber and fabric. Each of these strips may comprise one or more layers 3, 4, of such canvas or other fabric impregnated with or carrying phenolic condensation cementing material, and if desired a connector strip or layer 5 may be united to these stiffening and reinforcing strips and may be formed of relatively lighter canvas, for instance. Its other side may advantageously be formed with a frictioned or other coating 7 of rubber. This facilitates the preliminary incorporation of a strip or layer 6 of unvulcanized rubber composition of any suitable character so that the entire compound strip may be wound on the mandrel, the rubber and connector strips being of greater width naturally extending out on both sides of the reinforcing strip or member. These projecting lateral portions may overlap as different turns of this compond strip are wound upon the mandrel and as indicated one turn to the right adjacent the lining layer 2 may have its projecting rubber strip 11 compressed by the overlying rubber strip 8 of the next turn of this material. If desired also another connector strip of similar fabric may be wound in contact with the exposed reinforcing strips and as indicated in Fig. 2 such a connector strip 9 may have a frictioned or other rubber coating 10 thereon and be thereby adhesively secured to a rubber layer or strip 12 so that this compound strip may be wound upon the strips on the mandrel so that the fabric engages the exposed reinforcing strips carrying such phenolic condensation cementing material and the edges of the strip may project at 13 between the adjacent edges of these reinforcing strips or members so as to fill these spaces and provide a relatively elastic flexible cushioning member between them in the finished hose fabric. If desired of course additional rubber may be wound on this complete reinforcing layer so as to form the intermediate layer 24 of rubber as indicated somewhat diagrammatically in Fig. 1. Upon this additional reinforcing strips may be wound if desired and preferably in the same spiral manner and staggered in position with respect to the first layer of spiral reinforcing members so that the spaces between the members in one layer are not opposite the spaces in the adjacent layer which gives increased strength against internal or external pressure. As indicated in Fig. 1 this outer layer of reinforcing members or strips may be differently formed and arranged and the reinforcing strips may in this instance comprise one or more layers of canvas or other woven or braided fabric 28, 29 which are impregnated with such phenolic condensation cementing material and may be adhesively or otherwise attached to connector strips 30, 31 on one or both sides of the reinforcing strips, these connector strips or members being preferably provided on their outer faces with frictioned or other rubber coatings so as to facilitate union with the adjacent rubber layers. Such a compound reinforcing strip may of course be wound on the rubber layer 24 for instance, and cushioning strips, such as 32, may be simultaneously wound on and be interposed between the adjacent edges of such reinforcing strips and then the covering layer 27 may be formed on the outside in any suitable way as by winding on a suitable strip of rubber composition. The entire hose fabric may then be vulcanized and cured in any suitable way, preferably under considerable pressure so that the parts are forced together and the rubber composition elements thoroughly vulcanized as by heating to 250 to 300 degrees F. more or less for an hour or so which heat treatment simultaneously cures and solidifies the phenolic condensation cementing material used and enables it to cement together and stiffen and strengthen the fabric elements with which it is used. A single heat pressure molding treatment thus forms the entire hose structure into a substantially unitary piece, the vulcanized rubber portions retaining sufficient flexibility and elasticity, especially when relatively pure strong rubber compositions are used, so as to allow the degree of bending desired while the strong and relatively rigid reinforcing elements strengthen the hose against internal or external pressure.

Fig. 3 shows another form of hose 14 in which three layers 15, 16 and 18 of such reinforcing elements are shown as embedded in the vulcanized rubber 17, the layers of which are interposed between the reinforcing and stiffening members or strips and also arranged to form a covering layer and a relatively thick lining layer which is somewhat more desirable for pressure hose. As indicated more in detail in Fig. 4 these stiffening reinforcing members may be of fibrous material and may as somewhat diagrammatically indicated be in the form of braided or woven tape which may be conveniently impregnated with such phenolic condensation cementing material and then wound into the hose during its manufacture in connection with the strips or layers of rubber composition. During the vulcanizing and curing treatment the heat seems to soften or melt such phenolic condensation cementing material sufficiently to allow the rubber composition to be forced into the fibers or interstices of the fabric or fibrous material and engage the same sufficiently so that a strong effective union of the rubber and fabric is secured. This makes it unnecessary in all cases to preliminarily coat the fabric or other fibrous material with a frictioned or other rubber coating before the vulcanizing and curing treatment unites the parts.

Braided or twisted cord or similar reinforcing elements may be used in this same general way as is indicated in Fig. 5 in which the cords 19 of either braided or twisted thread or fibrous material may be impregnated more or less thoroughly with such phenolic condensation cementing material in sufficient amount to give them the desired strength and stiffness when the curing operation is completed. Such cord reinforcing members may be incorporated in any desired way in the hose fabric and one or more spiral layers may be wound into the same during the manufacture. As indicated in Fig. 5 the hose may have a lining layer 22 of rubber composition upon which one or more uniting layers 20, 21 of canvas or other fabric may be applied which may have on one or both sides frictioned or other rubber coatings such as 26 to facilitate union of the rubber thereto during the vulcanizing process. The cord or reinforcing members 19 may be applied outside this uniting coating either in direct contact therewith or somewhat away from the same which makes possible an interposed cushioning layer of rubber which gives an increase of flexibility of the completed hose 18, although somewhat diminishing its strength against internal pressure. The rubber may of course extend outside these reinforcing elements so as to form a covering coating 23 in which the strengthening and stiffening members are embedded and the vulcanizing and curing heat treatment under pressure unites all of these members as previously described. Another form of hose 30 embodying such cord reinforcing members is shown in Fig. 6 as comprising a rubber lining layer 31 upon which a uniting layer 32 of canvas or other fabric may be arranged preferably after having one or both sides formed with a frictioned or other rubber coating. The cord or rope reinforcing members 33, which are preferably thoroughly impregnated with such phenolic condensation cementing material and dried, may be wound directly upon this uniting layer so as to more or less embed themselves therein. And rubber strips such as 34 may be wound between these reinforcing cords so as to be forced strongly into the spaces between them during the winding or subsequent processes so as to make a substantially even layer in connection with these stiffening reinforcing members which may, if desired, be advantageously arranged on the outside of the hose if it is exposed to considerable wear in service. If desired, however, a covering layer 35 of rubber may be applied so as to completely inclose the reinforcing members and all the parts may of course be vulcanized and cured together preferably under pressure which vulcanizes the rubber portions at the same time that the phenolic condensation cementing material is cured or solidified and unites all the elements of this hose preferably to cement the cords to the uniting fabric 32.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims:

1. The flexible vulcanized rubber hose comprising an inner rubber lining and a rubber covering, and comprising a plurality of staggered layers of spiral fabric stiffening strips of canvas impregnated with cured phenolic condensation cementing material, and connector strips interposed between said stiffening strips and the adjacent rubber and cemented and vulcanized thereto, said stiffening strips being longitudinally separated along said hose and having an interposed cushioning layer of rubber between them.

2. The flexible vulcanized rubber hose comprising an inner rubber lining and a rubber covering, and comprising a plurality of staggered layers of spiral fabric stiffening strips impregnated with cured phenolic condensation cementing material, and connector strips interposed between said stiffening strips and the adjacent rubber and cemented and vulcanized thereto.

3. The flexible rubber hose comprising a series of vulcanized rubber layers including a lining and covering, and comprising a plurality of interposed staggered layers of spirally arranged fabric reinforcing members of woven cotton fabric impregnated with cured phenolic condensation, stiffening and strengthening material and securely united to said rubber layers.

4. The flexible rubber hose comprising a series of vulcanized rubber layers including a lining and comprising a plurality of layers of spirally arranged fabric reinforcing members impregnated with cured phenolic condensation, stiffening and strengthening material and securely united to said rubber layers.

5. The rubber hose comprising a series of vulcanized rubber layers including a lining and comprising a plurality of staggered layers of spirally arranged fibrous reinforcing members carrying cured phenolic condensation stiffening and strengthening material and securely united to said rubber layers.

6. The rubber hose comprising a series of vulcanized rubber layers including a lining, and comprising a plurality of staggered layers of encircling separated fibrous reinforcing members carrying cured phenolic condensation stiffening and strengthening material and securely united to said rubber layers.

7. The rubber hose comprising a series of vulcanized rubber layers, and comprising a layer of encircling separated fibrous reinforcing members carrying cured phenolic condensation stiffening and strengthening material and securely united to said rubber layers.

8. The flexible rubber hose comprising a vulcanized rubber lining layer, and a layer of spirally arranged fibrous reinforcing members carrying cured phenolic condensation cementing material, and a connector strip engaging said reinforcing members and cemented thereto by said phenolic condensation cementing material and engaged by and cemented on its other side to the adjacent rubber layer.

9. The flexible rubber hose comprising a vulcanized rubber lining layer and a layer of spirally arranged fibrous reinforcing members carrying cured phenolic condensation cementing material, and cemented to the adjacent rubber layer.

10. The flexible rubber hose comprising a vulcanized rubber lining layer, and a layer of spirally arranged fabric reinforcing members comprising a plurality of layers carrying cured phenolic condensation cementing material, and a rubberized connector strip engaging said fabric and cemented thereto by said phenolic condensation cementing material and engaged by and cemented on its other side to the adjacent rubber layer.

11. The flexible rubber hose comprising a vulcanized rubber layer, and encircling fabric reinforcing members carrying cured phenolic condensation cementing material, and a rubberized connector engaging said fabric and cemented thereto by said phenolic condensation cementing material and engaged by and cemented on its other side to the adjacent rubber layer.

12. The rubber hose comprising a vulcanized rubber layer and encircling fibrous reinforcing members carrying cured phenolic condensation cementing material and cemented to the adjacent rubber layer.

13. The rubber hose comprising a vulcanized rubber layer and fibrous reinforcing and strengthening material carrying cured phenolic condensation cementing material and cemented to said rubber layer.

14. The rubber hose comprising vulcanized rubber and incorporated fibrous strengthening material carrying cured phenolic condensation cementing material.

HENRY C. EGERTON.